United States Patent [19]

Schenk et al.

[11] Patent Number: 5,090,518

[45] Date of Patent: Feb. 25, 1992

[54] BRAKE CONTROL SYSTEM

[75] Inventors: Donald E. Schenk, Vandalia, Ohio; Doonan D. McGraw, Naples, Fla.

[73] Assignee: General Motors Corporation, Detroit, Mich.

[21] Appl. No.: 531,796

[22] Filed: May 31, 1990

[51] Int. Cl.$^5$ .............................................. F16D 55/08
[52] U.S. Cl. .................................... 188/72.1; 188/157; 303/20
[58] Field of Search ................. 188/72.1, 72.3, 72.7, 188/156, 157, 161, 162, 158, 72.8; 303/20, 91, 95, 100

[56] References Cited

U.S. PATENT DOCUMENTS

| | | | |
|---|---|---|---|
| 3,420,580 | 1/1969 | Dymond . | |
| 4,602,702 | 7/1986 | Ohta et al. | 188/72.1 |
| 4,602,702 | 7/1986 | Ohta et al. | 188/72.1 |
| 4,623,044 | 11/1986 | Ohta et al. | 188/72.1 |
| 4,629,039 | 12/1986 | Imoto et al. | 188/72.1 |
| 4,653,815 | 3/1987 | Agarwal et al. . | |
| 4,705,323 | 11/1987 | Imoto | 188/72.1 |
| 4,765,140 | 8/1988 | Imoto et al. . | |
| 4,836,338 | 6/1989 | Taig | 188/72.1 |
| 4,854,424 | 8/1989 | Yamatoh et al. | 188/72.1 |
| 4,860,859 | 8/1989 | Yamatoh et al. | 188/72.1 |
| 4,932,726 | 6/1990 | Iwata et al. | 303/100 |
| 4,962,969 | 10/1990 | Davis | 188/156 X |

Primary Examiner—Robert J. Oberleitner
Assistant Examiner—Peter M. Poon
Attorney, Agent, or Firm—Howard N. Conkey

[57] ABSTRACT

A brake system using a pair of brake apply and release force units, the units having electric motors with non-backdriveable mechanical output members to supply the needed brake apply force to limit of capability of the motors. Piezoelectric elements that generate high forces with low expansion during rapid rates of change of applied voltage are positioned in brake apply force-transmitting series with the motor output members. These elements are alternately energized with applied voltage and deenergized, in opposite phase relation. The piezoelectric expansion effect of each energized element is mechanically captured in each energization cycle by the motor unit having the deenergized element so that the brake apply forces actually applied to actuate the brake are increased well beyond the maximum output of the motors. This is obtained by the alternating energization of the piezoelectric elements and the alternating follow-up actions of the motors, with the non-backdrivable arrangements acting to store the mechanical force increases so attained. Wheel lock control may be attained. When actuated, this feature sets the output force generated by the motors, deenergizes the piezoelectric elements, and then concurrently energizes and deenergizes them to obtain a brake pumping action while preventing excessive wheel slip.

15 Claims, 4 Drawing Sheets

BRAKE CONTROL SYSTEM

FIELD OF THE INVENTION

The invention relates to brakes and more particularly to an arrangement for applying and releasing brakes. A brake embodying the invention has at least two sets of primary and secondary actuating members. The primary and secondary actuating members of each set are arranged in brake apply force series relation.

BACKGROUND OF THE INVENTION

Brakes are commonly actuated by hydraulic, pneumatic, mechanical or electrical actuating members. An electric actuating member is disclosed in U.S. Pat. No. 3,420,580, entitled, "Skid Control Device" and issued Jan. 7, 1969. Another example of an electric brake actuating member is disclosed in U.S. Pat. No. 4,653,815, entitled, "Actuating Mechanism in a Vehicle Wheel Brake and Anti-lock Brake Control System" and issued Mar. 31, 1987.

An electric motor and alternatively hydraulic motor are the primary actuating members disclosed in U.S. Pat. No. 4,602,702, entitled, "Brake Apparatus" and issued July 29, 1986. In the electric motor embodiment, a switch changes operation from a driver for the electric motor, stopping the electric motor, to a driver for a piezoceramic element positioned to act in parallel to and thereafter take over from the stopped electric motor when the load on the electric motor exceeds a predetermined value. In the hydraulic motor or piston embodiment, when the load on the piston exceeds a predetermined value, the hydraulic actuating pressure is trapped behind the piston by closing a valve, and the piston is effectively locked in place. The driver for the piezoceramic element is energized at the same time. In either instance the piezoceramic element acts in parallel to and takes over from the initially actuated motor or piston, and the initially actuated motor or piston causes no further brake applying movement of the friction braking member.

A piezoceramic member electrically actuated brake, using the piezoceramic member as the only power brake actuator, is disclosed in U.S. Pat. No. 4,623,044, entitled, "Brake Apparatus" and issued Nov. 18, 1986.

In U.S. Pat. No. 4,765,140, entitled, "Piezoelectric Servomechanism Apparatus" and issued Aug. 23, 1988, a brake has a hydraulic piston actuator that has hydraulically trapped pressurized brake fluid in the wheel cylinder chamber in an apply position. It also has a floating plate in a chamber in the hydraulic piston that, with the head of the piston, defines another hydraulic pressure chamber. Within the piston and acting axially on the floating plate are two sets of piezoelectric elements. One set reacts on another part of the piston, and the other set reacts on another piston-like working member reciprocally mounted in the piston with one side exposed to the wheel cylinder chamber. When the piezoelectric elements are electrically energized at a low voltage, they contract to a reference position. The group of piezoelectric elements acting on the floating plate and reacting on the hydraulic piston then has a higher voltage applied to it, expanding that group. The other group is then shorter than the first group, and the working member on which the shorter other group reacts moves to decrease the pressure in the wheel cylinder chamber. High voltage is then applied to the other group of piezoelectric elements and low voltage is applied to the group that previously had the high voltage applied to it. The high voltage is then applied to both groups of elements concurrently, with the displacement amount of the working member being zero, followed by concurrently applying only the low voltage to both groups of elements concurrently. This switching of voltages to both groups of elements concurrently is then followed, and is said to displace the working member by twice the displacement obtainable when only one group of elements is activated with high voltage.

SUMMARY OF THE INVENTION

The primary actuating members of brake actuating member sets each have a non-backdriveable driveline. The primary actuating member of each set is capable of being power driven either in the brake apply direction or the brake release direction. The primary actuating members are energized for power in the brake apply direction when the brake is to be actuated. When the brake apply force demand is greater than the maximum brake apply forces that the primary actuating members can generate, or greater than the actual brake apply forces that the primary actuating members are energized to generate for the particular brake application, the secondary actuating members of each set are, or may be, alternately energized and deenergized. Such alternate energization and deenergization takes place in opposite phase relation.

When there are two sets of actuating members, the energized secondary actuating member generates additional brake apply force added to the brake apply force generated by its associated primary actuating member, further applying the brake. This further application of the brake decreases the resistance to brake apply force generated by the primary actuating member associated with the deenergized secondary actuating member, and that brake apply force moves the output of the set of actuating members with the deenergized secondary member in the brake applying direction until the resistance to the brake apply force generated by the primary actuating member is again equal to that brake apply force. This is effectively a follow-up action that catches up the set of actuating members having the deenergized secondary actuating member with the other set of actuating members.

The energization and deenergization of the two secondary actuating members are cyclicly reversed, meaning that the two secondary actuating members alternate in opposite phase relation. When one secondary actuating member in one set of actuating members is energized, the other secondary member in the other set of actuating members is deenergized.

In one embodiment of the invention the above-described mechanism is modified to add a wheel lock control function. When incipient wheel lock occurs during service braking of a vehicle, both primary actuator members are set or held so as to prevent further energization of them in the brake apply direction while the incipient wheel lock condition continues. This is easily accomplished by simply deenergizing both primary actuating members and using the non-backdriveable characteristics on the motor units to hold this position. Concurrently, the energized secondary actuating member is deenergized but the other one is not then energized in the alternate cyclic manner. Therefore both secondary actuating members are deenergized. This somewhat decreases the total brake apply force, resulting in a partial release of the brake to a lesser brake apply force value and a decrease in the amount of wheel slip. The secondary actuating members are then concurrently energized and deenergized to effectively pump the vehicle brake and keep the total brake apply force at or near the point where excessive wheel slip denoting incipient wheel lock would occur, but not attaining such excessive wheel slip. This keeps the brake at or near its maximum braking effort for the road conditions being traversed without causing the vehicle wheel being so braked to slip excessively on the road surface. It is well known that when the wheel does slip excessively it will quickly degenerate into a wheel lock condition which results in less effective braking and steering difficulties. When needed, the primary actuating members are controlled to increase or further decrease the brake apply forces exerted by them so as to maintain a total braking effort at which the wheel does not slip excessively irrespective of brake apply force demand placed on the brake by the vehicle operator. This occurs when different road surface characteristics resulting in different road surface coefficients of friction are encountered during the braking operation.

BRIEF DESCRIPTION OF THE DRAWING

FIG. 3 is comparable to FIG. 2, but shows operation during brake release. Both Figures show reversal cycles in an expanded manner in relation to the frequency of such reversals, and show many fewer such cycles than actually occur in order to maintain concept clarity.

DETAILED DESCRIPTION

Figure 1:
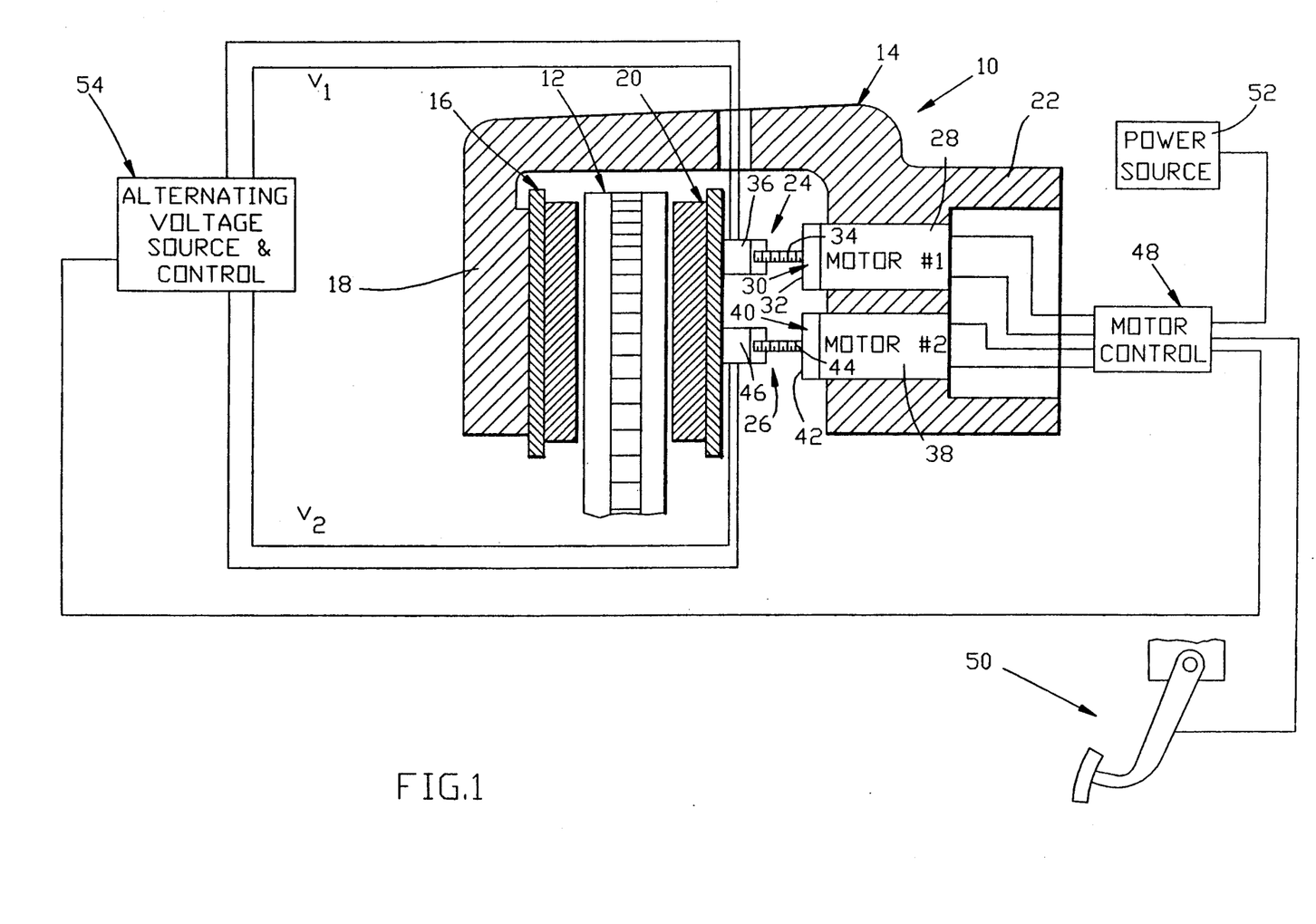
FIG. 1 is a schematic representation of a brake embodying the invention.

The brake assembly 10 of FIG. 1 is schematically illustrated as a floating caliper disc brake. It is appreciated, however, that it may be any of several other types of brakes, such as a fixed caliper-sliding rotor disc brake; an opposed actuator, fixed caliper, disc brake with an axially fixed rotor; and various arrangements of drum brakes.

The assembly 10 includes a rotatable rotor 12 to be braked, a caliper housing 14, and an outboard brake shoe assembly 16 mounted on the caliper housing outer leg 18 and in friction braking relation with one side of rotor 12 when the brake assembly is energized. It also includes an inboard brake shoe assembly 20 mounted for friction braking engagement with the other side of rotor 12 when the brake assembly is energized.

Caliper housing 14 has an inboard leg 22 in which the mechanism for applying braking forces to the brake shoe assemblies is located. The inboard brake shoe assembly is operatively mounted on inboard leg 22. As is commonly known, it may deliver its brake torque to the caliper housing 14 or to a fixed member. Since this forms no part of the invention, such details are not illustrated.

In the typical hydraulic pressure actuated brake, this mechanism is a piston in a pressure chamber, with hydraulic brake actuating pressure acting on the piston to move the brake shoe assembly 20 into braking engagement with the rotor 12 and to react on the caliper housing 14 to move the brake shoe assembly 16 into braking engagement with the rotor. In this embodiment, however, the brake is actuated by motor units, two such units 24 and 26 being schematically illustrated. If a hybrid system is preferred, the electric motors in the motor units 24 and 26 may be replaced by any of several other noted types of actuators, such as hydraulic pressure actuators with the use of a master cylinder. However, further detailed description will be directed to the use of electric motors as the primary actuating members in those motor units.

Motor unit 24 includes a reversible motor 28, labeled motor #1, an output drive 30 having a non-backdriveable linkage or output 32 formed by the rotatable internal drive threads of the output drive 30 and cooperating external threads of the motor output shaft 34. Shaft 34 is driven axially, or at least urged in an axial direction, when motor 28 is energized and output drive 30 is driven, or at least urged, in one rotatable direction or the other by the motor. Motor 28 and output drive 30 define a first primary actuating unit. The output drive 30, which includes its rotatable internal drive threads and the cooperating external threads of the motor output shaft 34, is a power screw driveline. A piezoelectric crystal or element 36 is located axially intermediate drive 30 and the brake shoe assembly 20. Crystal 36 is shown as being in axial force transmitting relation with the output shaft 34 and the brake shoe assembly 20. Crystal 36 defines a first secondary actuating unit and is also a part of motor unit 24.

Motor unit 26 includes a reversible motor 38, labeled motor #2, an output drive 40 having a non-backdriveable linkage or output 42 formed by the rotatable internal drive threads of the output drive 40 and cooperating external threads of the motor output shaft 44. Shaft 44 is driven axially, or at least urged in an axial direction, when motor 38 is energized and output drive 30 is driven, or at least urged, in one rotatable direction or the other by the motor. Motor 38 and output drive 40 define a second primary actuating unit. The output drive 40, which includes its rotatable internal drive threads or screw leads and the cooperating external drive threads or screw leads of the motor output shaft 44, is a power screw driveline. A piezoelectric crystal or element 46 is located axially intermediate drive 40 and the brake shoe assembly 20. Crystal 46 is shown as being in axial force transmitting relation with the output drive 40 and the brake shoe assembly 20. Crystal 46 defines a second secondary actuating unit and is also a part of motor unit 26.

Motors 28 and 38 are mounted in and secured to caliper housing leg 22 so that they react on the caliper housing 14 when they are exerting brake apply forces on brake shoe assembly 20, and the reaction forces are transmitted through the caliper housing to the brake shoe assembly 16. These reaction forces become the brake apply forces acting on brake shoe assembly 16 when the motors are energized in the brake apply direction. Motors 28 and 38 are controlled by motor control 48, which is in turn controlled by a braking force demand input member schematically shown as a brake pedal assembly 50. Motor control 48 has a suitable source of power 52.

An alternating electrical power voltage source and controller 54 controls and alternately supplies electrical power to the piezoelectric crystals 36 and 46. When power is being supplied to crystal 36, its voltage is identified as $V_1$. When power is being supplied to crystal 46, its voltage is identified as $V_2$.

Figure 2:
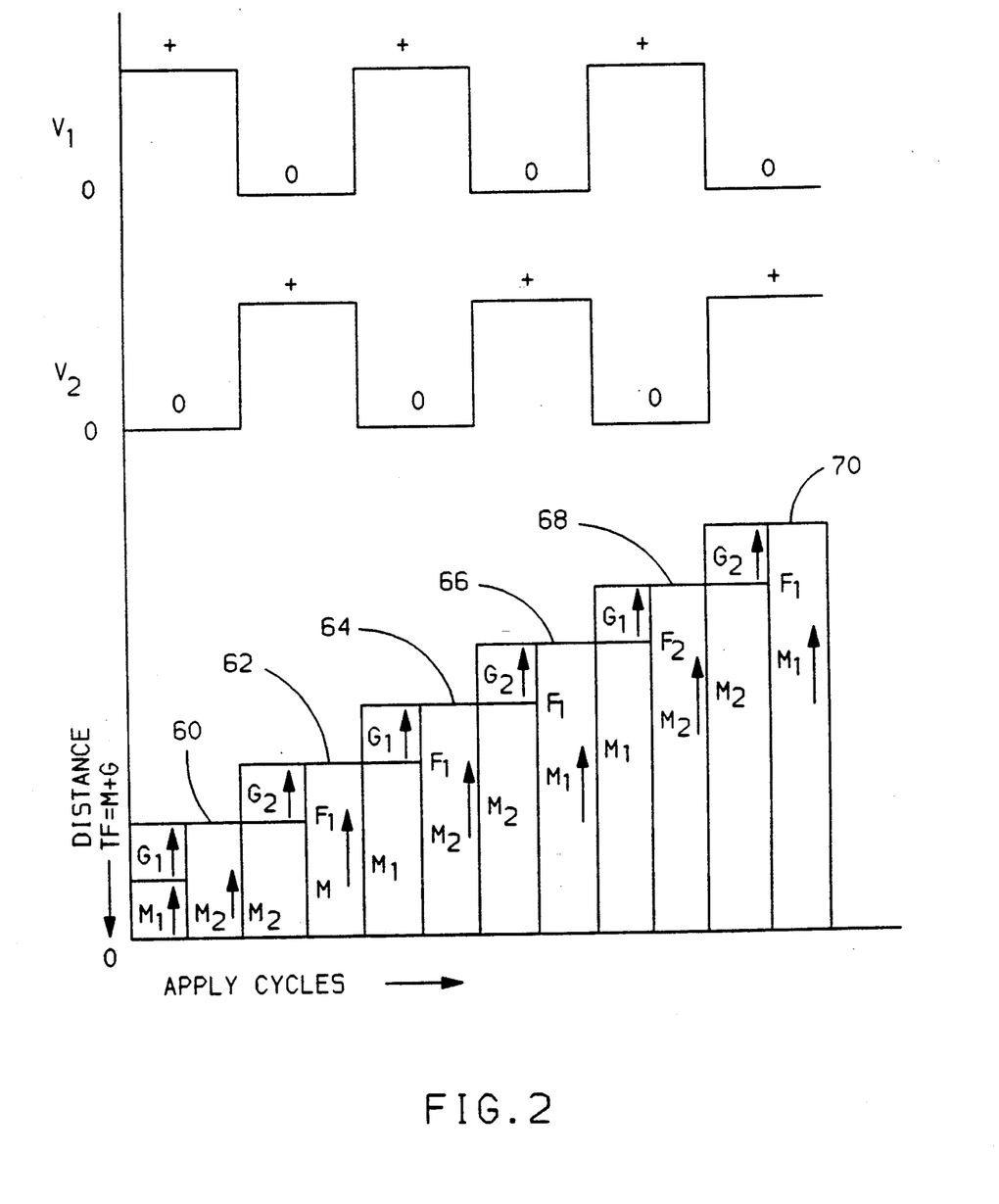
FIG. 2 is a three-part graph schematically showing the alternate and opposite phases of voltage applications to the two secondary actuating members of FIG. 1 during brake apply, and graphically illustrating the forces that are generated and applied to the brake shoe assembly of the brake of FIG. 1 during each reversal of application of the voltages as the total brake apply force increases until it meets the demanded brake apply force.
Figure 3:
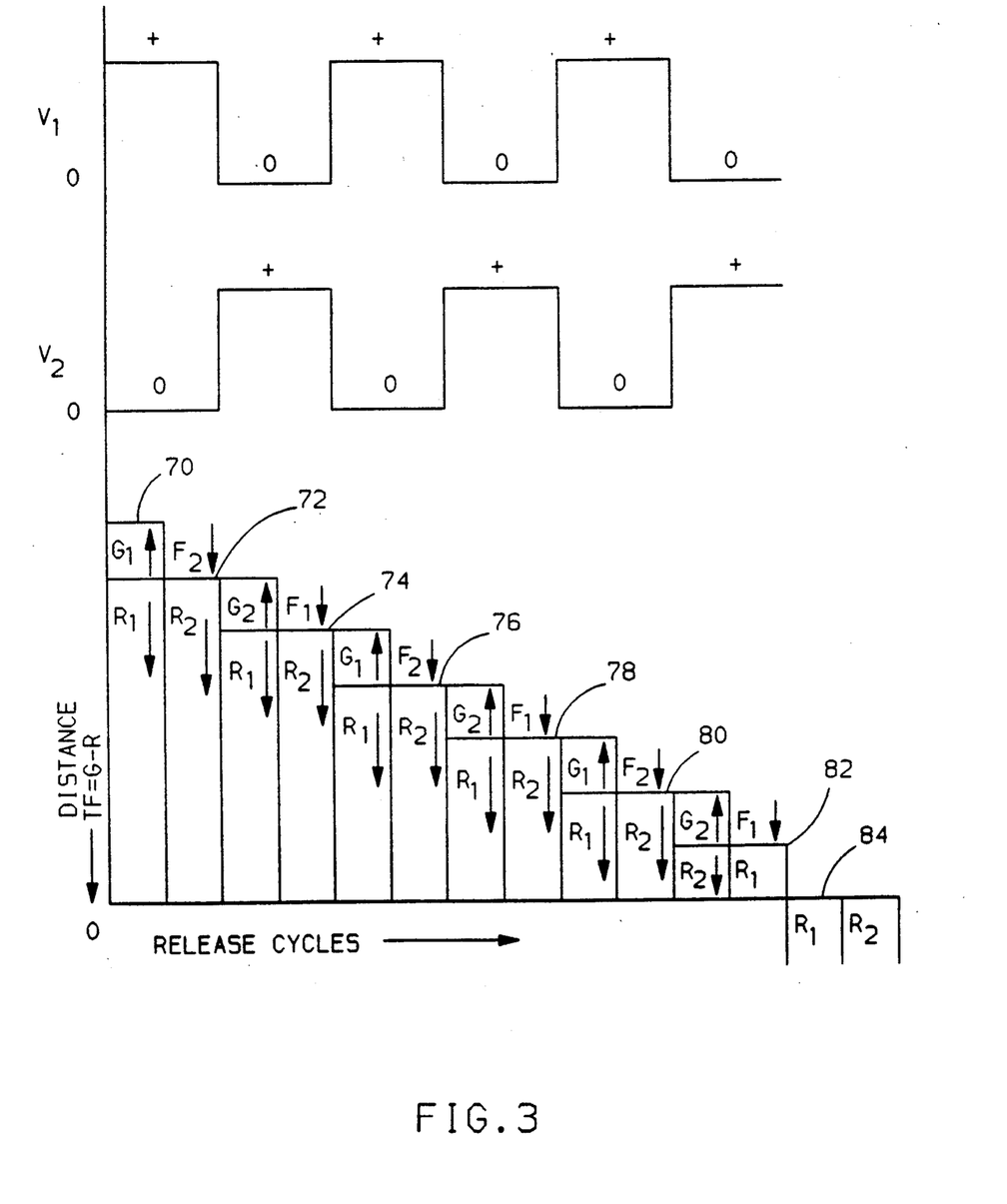

FIG. 2 is a graphic illustration of the operation of the invention during a full brake apply from the brake fully released condition, and FIG. 3 is a graphic illustration of the operation of the invention during a full brake release following the full brake apply of FIG. 2. Power voltages $V_1$ and $V_2$ are applied to and removed from the respective crystals 36 and 46 in a 180° phase relation. That is, while power voltage $V_1$ is on, power voltage $V_2$ is off, and vice versa. Three such cycles are shown in the top and center graphs, with the (+) sign indicating that the power voltage is on, and the (o) sign indicating that the power voltage is off.

The bottom graphs in FIGS. 2 and 3 schematically show the movements of the brake shoe assembly 20 and the forces and movements of the output drives 30 and 40 and the crystals 36 and 46 that cause the movements of the brake shoe assembly. FIG. 2 shows the brake assembly 10 being energized from a full released condition to a full apply condition. FIG. 3 shows the brake assembly 10 being released from the full apply condition to the full released condition.

The labels used in FIGS. 2 and 3 and/or in the following discussion have the following meanings. Some of the below-listed labels are presented for root meanings of the labels so used.

TF = Total Force of brake apply or release at any moment in time. It is referred to as $TF_a$ if apply force and $TF_r$ if brake release force.

M = Motor apply force (Obtained when a motor is energized in the brake apply direction.)

$M_x$ = M that a motor can deliver.

$M_1$ = M exerted by motor #1.

$M_2$ = M exerted by motor #2.

R Motor release force. It is negative in relation to M and G. (Obtained when the motor is energized in the brake release direction.)

G = Movement and force attributed to axial crystal Growth caused by voltage applied to a crystal. The amount of growth attained may be controlled, within limits, by the rate application of voltage increase.

$G_1$ = G of crystal 36, connected with motor #1

$G_2$ = G of crystal 46, connected with motor #2.

C = Movement and force attributed to crystal Contraction caused when voltage is removed from a crystal.

$C_1$ = C of crystal 36, connected with motor #1.

$C_2$ = C of crystal 46, connected with motor #2.

F = the Follow-up action occurring to the contracted (not-energized) crystal and output drive, driven by the motor associated with that crystal and output drive, when the expanded (energized) crystal moves the brake shoe assembly 20 away from the contracted crystal and output drive during brake application. During brake release, it occurs when the expanded (energized) crystal holds the brake shoe assembly 20 in a position that the contracted crystal and output drive is not so loaded, and the reversing action of the output drive occurs.

$F_1$ = Follow-up action of crystal 36 and output drive 30, driven by motor #1.

$F_2$ = Follow-up action of crystal 46 and output drive 40, driven by motor #2.

The following relationships apply:

$$TF = (M - R) + G \qquad \text{(general formula)}$$

During brake apply:

M = a force value acting toward rotor 12.

R = 0

Therefore, $$TF = M + G \qquad \text{(apply formula)}$$

When the crystal is deenergized, it contracts by the axial distance C, which is equal and opposite to G. Thus, when C occurs, G becomes zero and $TF_a = M$ During brake release:

M = 0

R = a force value acting away from rotor 12. It is mathematically negative in relation to M.

Therefore, $$TF_r = G - R \qquad \text{(release formula)}$$

When the crystal is deenergized, it contracts by the axial distance 0, which is equal and opposite to G. Thus, when C occurs, G becomes zero and $TF_r = -R$ In FIG. 2, it is assumed that the alternating voltage source and controller 54 begins to send its alternate voltages to crystals 36 and 46 as soon as the pedal 50 is actuated, and that the motor control 48 is also activated at that time. It is further assumed that the first alternate voltage cycle begins with voltage $V_1$ energizing crystal 36, and crystal 46 is not energized.

Motors 28 and 38 are energized in the brake apply direction when the motor control 48 is activated, rotating both screw output drives 30 and 40 and driving shafts 34 and 44, crystals 36 and 46 and shoe assembly 20 toward rotor 12. At the same time, crystal 36 is energized, and has an axial growth $G_1$ that has the effect of axially lengthening shaft 34 relative to the length of shaft 44. Shoe assembly 20 frictionally engages rotor 12 and the brake apply force is increased until motors 28 and 38 either reach their maximum force outputs or their controlled maximum force outputs $M_1$ and $M_2$. However, because of the crystal growth $G_1$ of energized crystal 36, but no crystal growth of deenergized crystal 38, the motor shaft 34 does not move axially quite as far (by the amount $G_1$) as does the motor shaft 44. Yet the total movement of the outer faces of the crystals 36 and 46 where they engage the brake shoe assembly 20 is the same for each motor, being $M_1 + G_1$ for unit 24 and $M_2$ for unit 26. At this point, each motor is exerting the same force on the brake shoe assembly, as graphically shown by line 60 in FIG. 2 in the schematic first half of the schematic first cycle. Depending upon the length of time required for each motor to reach its maximum force output, and the frequency of the alternating voltage cycles, this may actually take several such cycles to attain this condition, but it is easier to graph and understand when presented as if it occurs in the first half of the first cycle. This simplified graphing and explanation will be used throughout, but it is to be appreciated that it is only for graphing and simpler descriptive purposes.

The second half of the cycle then occurs, and the voltage $V_1$ to crystal 36 becomes zero while the voltage $V_2$ is positive. When crystal 36 is deenergized, it contracts axially by the distance $C_1$. This lessens the shoe assembly's resistance to force $M_1$, so the motor 28 immediately moves shaft 34 and crystal 36 axially until the maximum motor force $M_1$ is again applied to the shoe assembly 20. Concurrently, energization of crystal 46 causes that crystal to expand axially by the value $G_2$. The force value of $G_2$ is added to the force value $M_2$. This occurs because the motor 38 is non-backdriveable and the attained distance $M_2$ is not decreased. The total force $TF_a$ applied to the shoe assembly by unit 26 is therefore greater than the maximum apply force generated by motor 38 alone, and this moves shoe assembly 20 more tightly into engagement with rotor 12. This is schematically indicated by line 62 in FIG. 2. At the same time, the crystal 36 and shaft 34 are moved in a follow-up manner by the amount $F_1$ so that the maximum brake apply force $M_1$ continues to be exerted on the brake shoe assembly 20 by motor 28.

As graphically shown in FIG. 2, this continues through the second and third cycles to force lines 64 and 66, and force lines 68 and 70, when, for graphical reasons, it is presumed that the demanded brake force has been reached when force line 70 is attained. The alternating voltages are then discontinued, and with that occurrence, $G_2$ in the last half of the third cycle becomes zero, and motor 38 moves $M_2$ up to line 70 as well. The non-backdriveable features of drive outputs 30 and 40 prevent any backing up of the shafts 34 and 44 or motors 28 and 38, so this brake apply force is maintained until either a greater or lesser apply force is demanded. Both motors 28 and 38 may be deenergized if this is to be held for some period of time. The brake parking brake mode may be invoked in this manner if desired. When operating in the service braking mode, the brake apply force demand is usually changing so that it is not necessary to so deenergize the motors.

A slightly modified method of control and operation of the brake assembly 1? during service brake apply may be that of delaying energization of either of the piezoelectric crystals 36 and 46 until the maximum capacity of the motors 24 and 26 to apply braking force is exceeded by the demand for more braking force. Thus moderate braking demands that can be met by the motors without any energization of the crystals are in fact met by energization of the motors only. This can be accomplished by sensing the fact that the motor output torques are at a maximum and that concurrently there is greater braking force demand than that attained by the motors alone.

Such sensing may use the values of the electric current delivered to the motors, which will be at a maximum when the motors are at maximum output torque. The crystals are then alternately energized as above described and the cycle graphically illustrated in FIG. 2 is followed once a selected motor current value is attained.

Another manner of sensing the attainment of maximum motor output torque is based on the fact that the motor speed becomes zero when its torque is at its maximum. Motor brush electrical noise, generated each time the motor rotor passes a brush, may be detected as an indicator of motor speed. This noise will cease when the motor speed is zero, indicating that the motor is at its maximum output torque value. Thus, when the electrical brush noise ceases while a greater brake force demand still exists, the crystals are then alternately energized as above described, and the cycle graphically illustrated in FIG. 2 is followed.

Usually, in the service braking mode, within a short time after the brake is so applied, the brake apply force demand is decreased, or becomes zero as the brake is to be fully released. When that occurs, the mechanism is again operated, this time as graphically illustrated in FIG. 3. The motors 28 and 38 are energized to turn their output drives 30 and 40 in their opposite directions from the apply mode, generating release forces $R_1$ and $R_2$. The crystals 36 and 46 are again alternately energized and deenergized, with follow-ups in the release direction occurring as first one, then the other, of the crystals grows and takes the load from the brake shoe assembly 20. The total force TF is therefore decreased incrementally from line 70 as shown incrementally by lines 72, 74, 76, 78, 80, 82 and 84. Line 84 represents zero brake apply or release force. When it is reached, the zero brake force demand has been attained, and motor control 48 and alternating power source and control 54 deenergize both motors 28 and 38 and crystals 36 and 46.

In some applications, the crystals 36 and 46 need not be energized during part or even all of the brake release operation. They may be energized as above described for a few (e.g., one or two) cycles to obtain breakaway torque, and then no longer be energized, letting the motors alone complete the brake release operation. If initial releasing energization of the motors will obtain the necessary breakaway torque, the crystals will not have to be energized at all during brake release. In some such applications, the crystals need not be energized during brake release once the instantaneous actual, but decreasing, brake apply force becomes less than the maximum capacity of the motors, because the motors alone will act to continue to back off irrespective of the expansion and contraction of the crystals.

Since piezoelectric crystals also generate electricity in response to compression loading, and during any brake apply force conditions the crystals that transmit the brake apply forces from the motors 26 and 28 to the brake shoe assembly 20 are under compression, the crystals 36 and 46 may be used as actual brake apply force sensors while they are not energized. Where alternate energization of those crystals does not permit the employment of them as actual brake apply force sensors, another set of piezoelectric crystals, positioned in physical force-transmitting series with the main set of crystals 36 and 46, may be used for such sensing. In either event the electricity, generated when such crystals are under compression and the brake apply force sensed, causes a signal indicating that the actual brake apply forces have increased until the fully energized motor maximum apply force capacities have been attained. This signal will then activate the crystal controller 54, and crystals 36 and 46 will begin their alternating expansion-contraction cycles.

During brake release, this signal ceases and the crystal controller 54 will be deactivated. The action of the motors 28 and 38 in brake release will then continue without further expansion and contraction of the crystals.

Figure 4:
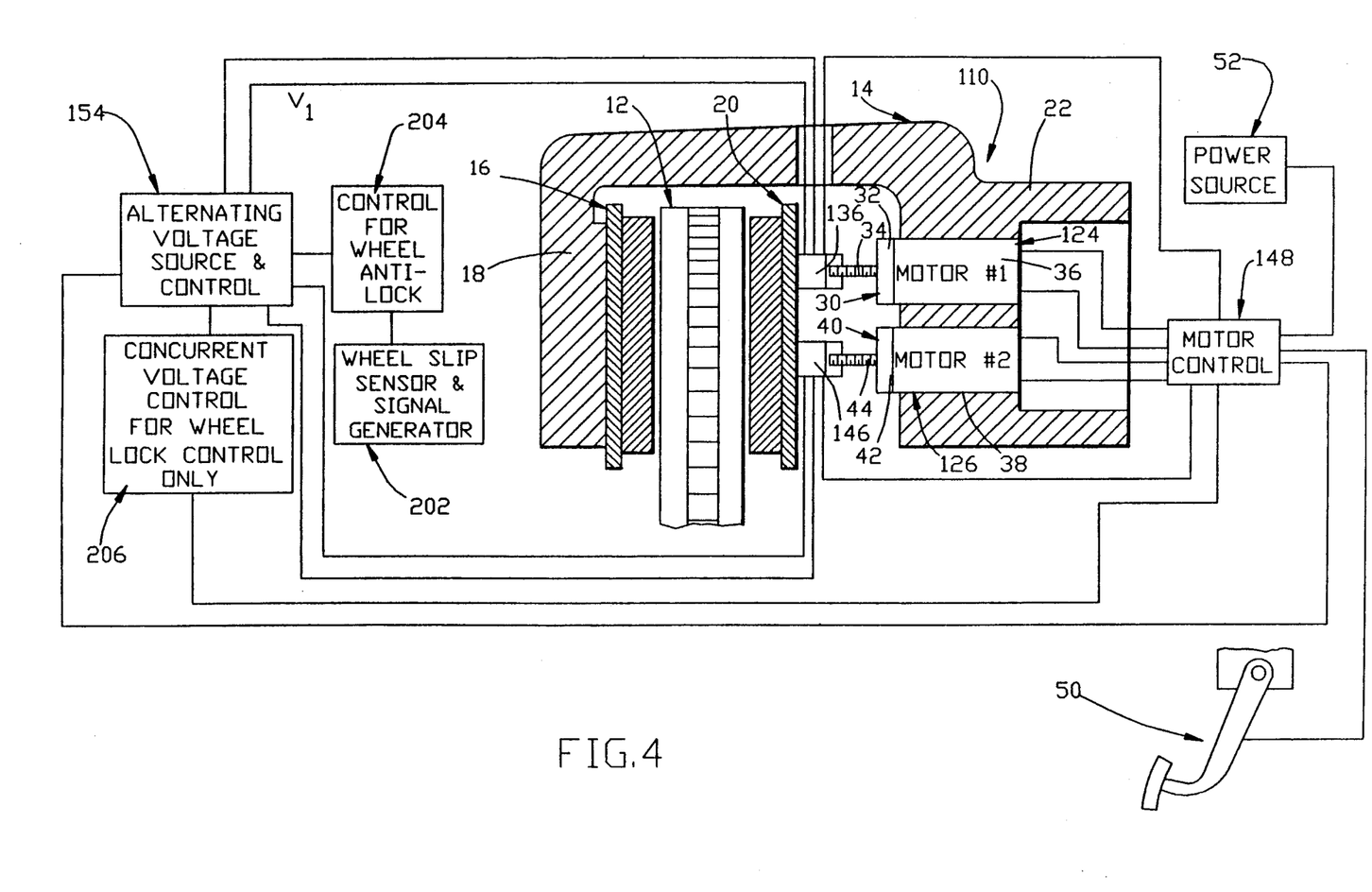
FIG. 4 schematically illustrates a modification to the brake assembly of FIG. 1, by which a wheel lock control function is added to the service braking function.

The modified brake assembly 110 schematically illustrated in FIG. 4 has many elements common with brake assembly 10 of FIG. 1, and such common elements have the same reference characters. Modified elements and subassemblies in FIG. 4 that are similar but not identical with elements and subassemblies in FIG. 1 are assigned related reference numerals in the 100 series, and added elements and subassemblies are assigned reference numerals in the 200 series.

Modified elements include assembly 110, motor units 124 and 126, piezoelectric crystals 136 and 146, motor control 148, and alternating voltage source and control 154. Added subassemblies or elements are the wheel slip sensor and signal generator 202, the control 204 for wheel anti-lock, and the concurrent voltage control 206 for wheel lock control only.

The brake assembly 110 includes the features of brake assembly 10, with the addition of a wheel lock control arrangement that will control the brake assembly to prevent or minimize wheel skidding during braking due to lock-up of the braked wheel or wheels of the vehicle actuated and released by action of motor units 124 and 126. The piezoelectric crystals 136 and 146, which are normally used in service braking in the same manner as are crystals 36 and 46, are also used in cycling a wheel lock control system when needed. The service brake mode of brake operation is attained through operation of the brake pedal assembly 50 in the manner described with regard to FIG. 1. When the sensor and signal generator 202 senses a percentage wheel slip that indicates incipient wheel lock due to the amount of service braking force being applied under the particular road-to-tire adhesion conditions being encountered (such percentage wheel slip being in the range of about 15% to 25%, and commonly about 20%), the actually-attained brake apply forces generated by the primary actuating motors 128 and 138 at the time the wheel slip signal is generated is set as the desired maximum attainable braking force during wheel lock control braking. This is done by deenergizing both of those motors. Crystals 136 and 146 are both deenergized, and then concurrently cyclicly energized and deenergized to prevent the percentage wheel slip from increasing to and beyond the incipient wheel lock stage and to obtain the desired pumping action of the brake.

Since the values of the output forces $G_1$ and $G_2$ generated by the expansion of the crystals 136 and 146 (and crystals 36 and 46 as well) are proportional to the rate of change in the input voltages to those crystals, the range of brake actuating force changes occurring during the pumping action of the brake to prevent excessive wheel slip can be controlled by varying the rate of change in the input voltages to the crystals 136 and 146. A larger range of brake actuating forces is obtained by a higher rate of input voltage application, and a smaller range of brake actuating forces is obtained by a lower rate of input voltage application.

If excessive wheel slip incipiently occurs even at the motor settings for that actually-attained braking force, the wheel slip signal to the motor controller causes the controller to reverse the motors until a lesser motor setting is attained that does not cause the wheel slip to be incipiently excessive, and a new, lower motor setting is made.

The modifications of the brake assembly 10 to that of the brake assembly 110 shown in FIG. 4 provide for these procedures. With the rotor 12 being braked by normal service braking actuation of brake assembly 110, and with incipient excessive wheel slip occurring, the wheel slip sensor and signal generator 202 (which has been sensing wheel slip whenever the brakes are applied so as to cause any wheel slip) generates a signal that such incipient excessive wheel slip has been reached, and the signal is sent to the control 204 for wheel anti-lock or wheel lock control. Control 204 controls the alternating voltage and source control 154 so that control 154 sends a signal to the motor control 148. Control 148 then sets the braking force attained by motor actuation at the time of the occurrence of incipient excessive wheel slip as the maximum braking force now attainable by motor actuation. The motor control also generates a signal sent to the concurrent voltage control 206. That control in turn causes control 154 to concurrently deenergize and then energize the piezoelectric crystals 136 and 146. The rate of concurrent voltage removal from and application to the crystals 136 and 146 is preferably varied as the wheel lock sequence continues, such variation being controlled by motor control 148 and concurrent voltage control 206, acting through control 154 and using signal information being provided to the motor control and hence to the concurrent voltage control based on the signals from the sensor and generator 202 and the control 204. The initial rate of voltage changes is preferably at a relatively high frequency so that a greater initial crystal contraction occurs to quickly decrease the actual brake application force and prevent or minimize the opportunity for the wheel slip to increase beyond the incipiently excessive wheel slip value first sensed. As the wheel lock control mode of operation continues, the rate of voltage changes may be decreased, resulting in less growth and contraction of the crystals in each cycle, and reducing the difference between the maximum braking force being applied and the lesser braking force being applied during each pumping cycle while keeping the sensed wheel slip below the incipiently excessive amount of wheel slip.

If, instead of a constant value of applied braking force resulting in a constant amount of wheel slip, due to changes in the friction characteristics of the road surface and therefore changes in the tire-to-road surface adhesion, a higher or lower value of total applied braking force is desirable, the signals generated by sensor and signal generator 202 will cause the control 204 to call for changes in the applied braking force through the voltage source and control 154 to the motor control 148 as well as to the crystals 136 and 146. This will typically cause the motors 36 and 38 to be actuated to either increase or decrease the motor-caused brake apply forces as needed. It may also modify the voltage change rates to the crystals as well, via controls 206 and 154. This will set a new, lower or higher (as appropriate) motor setting of maximum brake apply force attained due to the motors.

What is claimed is:

1. A brake apparatus comprising an actuator mechanism for generating a desired braking force by moving friction braking means into friction braking contact with a movable member to be braked, said actuator mechanism comprising:

first and second primary actuating units operable in forward movement for moving said friction braking means into friction braking contact with said movable member to be braked and generating a braking force which urges said friction braking means into friction braking relation with said movable member to be braked to achieve at least a part of the total actual braking effort of the brake apparatus when actuated, and operable in backing up movement to decrease and when desired to eliminate the generated braking force, said primary actuating units each having a non-backdriveable output preventing backing up movement thereof when it is loaded beyond its braking force output;

first and second secondary actuating units respectively in braking force transmitting series with said first and second primary actuating units for generating braking force which is additional to the braking force output of said first and second primary actuating units and further urging said friction braking means into greater friction braking relation with said movable member to be braked;

a first controller for operating said first and second primary actuating units in accordance with braking force demands and maintaining said first and second primary actuating units at their maximum braking force outputs while the braking force demands exceed their maximum braking force outputs;

and a second controller for alternately operating said first and second secondary actuating units to alternately urge said friction braking means into greater friction braking relation with said movable member to be braked and in so doing the operated one of said secondary actuating units acting to reduce the resistance to further actuating movements of an associated one of said primary actuating units associated with the other of said secondary actuating units below said associated one of said primary actuating units maximum braking force output so that said associated one of said primary actuating units, being continually operated to attain its maximum braking force output, follows up the action of the operated one of said secondary actuating units until said associated one of said primary actuating units maximum braking force output is again attained;

said alternate operation and stepped follow-up actions being cyclicly continued until the braking force demand is attained.

2. The brake apparatus of claim 1 in which said secondary actuating units include piezoelectric crystals and said second controller controls the application of electric voltage to said first and second secondary actuating unit crystals in alternate phase relation.

3. The brake apparatus of claim 1 in which said first and second primary actuating units each include a reversibly actuatable motor.

4. The brake apparatus of claim 1 in which said first and second primary actuating units each include a reversibly actuatable electric motor, and said non-backdriveable output includes a power screw driveline driven by said motor, said power screw driveline having non-backdriveable screw leads.

5. The brake apparatus of claim 1 in which said first and second primary actuating units each include a reversibly actuatable motor, said secondary actuating units include piezoelectric crystals, and said second controller controls the application of electric voltage to said first and second secondary actuating unit crystals at a selected rate of change of voltage input in alternate phase relation.

6. In a brake having a rotatable member to be braked and friction braking means arranged to be moved into and out of friction braking engagement with said rotatable member, a brake apply and release mechanism comprising:

a plurality of brake apply and release units, each of said units including a reversible motor having an output drive and a mechanical non-backdriveable linkage through which said motor output drive acts on said friction braking means, said non-backdrivable linkage permitting releasing movement of said motor output drive only when said motor is energized to deliver brake releasing force through said output drive to said friction braking means, said motor having a maximum brake apply braking force capability which is less than the maximum desired brake apply braking force, and piezoelectric crystal means positioned and aligned in axially intermediate force transmitted relation between said non-backdriveable linkage and said friction braking means, said crystal mean shaving the property of physical expansion at least axially when subjected to variable voltage electrical power in accordance with the voltage of that power, said crystal means further having the property of physical contraction relative to said physical expansion as variable voltage electrical power is removed therefrom, also in accordance with the voltage of that power;

motor control means for increasingly energizing said motors in the brake apply direction to increasingly apply said friction braking means to said rotatable member to be braked in accordance with the desired brake apply braking force up to said maximum motor capability and to hold said motors at said maximum motor capability so long as the desired brake apply braking force is at least as great as said maximum motor capability, and for reversing said motors by energizing them in the brake release direction to decreasingly apply said friction braking means to said rotatable member to be braked as the desired brake apply braking force is decreased below said maximum motor capability until the desired brake apply braking force is reduced to zero;

and crystal control means for said crystal means for selectively step-energizing and deenergizing one of said crystal means of one of said brake apply and release units and another of said crystal means of another of said brake apply and release units in opposite phase relation to cause said one crystal means to expand while said another crystal means is contracted and in step fashion then to cause said one crystal means to contract while said another crystal means is expanded;

the alternate and opposite-acting expansion and contraction of said one and another crystal means acting during crystal means expansions to alternately and cumulatively increase the brake apply braking force to said friction braking means beyond said maximum motor capability, said non-backdriveable linkage preventing loss of the alternately added brake apply braking process as said crystal means are contracted;

each one of said motors while energized to its maximum capacity in the brake apply direction acting, while the associated crystal means of said one of said motors energized at maximum capacity is contracted and the crystal means of the other motor is expanded, to move the output drive of said one of said motors energized at maximum capacity further in the brake apply direction as the expansion of the crystal means of said other motor reduces the brake apply load of the motor having the contracted crystal means to less than the maximum motor capability, until the maximum motor capability of said one of said motors energized at maximum capacity is again attained after which the associated non-backdriveable linkage of said one of said motors energized at maximum capacity prevents reverse movement of the motor as that motor's crystal means is then expanded while the crystal means of another motor is contracted, thus increasing the total brake apply braking force exerted on said friction braking means beyond the maximum capabilities of said motors;

each one of said motors while energized in the brake release direction in accordance with a decrease in desired braking force acting, while the associated crystal means of said one of said motors energized in the brake release direction is contracted and the crystal means of the other motor is expanded, to move the output drive of said one of said motors energized in the brake release direction further in the brake release direction as the expansion of the crystal means of the other motor reduces the brake apply load of the motor having the contracted crystal means to less than the maximum motor capability so that the associated non-backdriveable linkage of said one of said motors energized in the brake release direction is ineffective to prevent said brake release direction movement of the motor output drive, the non-backdriveable linkage of the motor having the expanded crystal means preventing brake release direction movement of that motor's output drive until sufficient brake releasing movement has occurred to decrease the brake apply force on said friction braking means below the motor maximum capacity, after which, when the desired decreased braking force is less than the motor maximum capacity, all of said motors move their respective output drives in the brake releasing direction, obtaining the desired decreased braking force.

7. The method of actuating a brake apparatus to a demanded brake force applying level, the brake apparatus having a device which is to be braked when the brake apparatus is actuated, first and second primary brake actuating units and first and second secondary brake actuating units respectively in brake force applying series with said first and second primary brake actuating units to apply the brake apparatus, said method comprising the steps of:

(a) energizing said primary brake actuating units and actuating the brake apparatus to a first brake force brake applying level in which the brake apparatus is at least partially braking the device to be braked by energization of only said primary brake actuating units which is less than the demanded brake force level;

(b) maintaining said primary brake actuating units so energized to maintain the first brake force level;

(c) cyclicly alternately and oppositely energizing and deenergizing said first and second secondary brake actuating units, increasing the total brake force applied to the device to be braked by the energized secondary brake actuating unit and its associated primary brake actuating unit beyond the first brake force level attained by energization of that primary brake actuating unit and decreasing the total brake force applied to the device to be braked by the primary brake actuating unit associated with the deenergized secondary brake actuating unit below the first brake force level attained by energization of that primary brake actuating unit, causing the primary brake actuating unit associated with the deenergized secondary brake actuating unit to follow up the action of the energized secondary brake actuating unit and the primary brake actuating unit associated with the energized secondary brake actuating unit has been inserted until the primary brake actuating unit associated with the deenergized secondary brake actuating unit again attains the first brake force level;

(d) and continuing said cyclicly alternate operation and stepped follow-up actions until the demanded total braking force is met.

8. The method of actuating a brake apparatus to a demanded brake force level, the brake apparatus having first and second primary brake actuating units and first and second secondary brake actuating units respectively in brake force applying series with said first and second primary brake actuating units, said method comprising the steps of:

(a) energizing said primary brake actuating units and actuating the brake apparatus to a maximum brake force level attainable by energization of only said primary brake actuating units but less than the demanded brake force level;

(b) maintaining said primary brake actuating units so energized;

(c) cyclicly alternately and oppositely energizing and deenergizing said first and second secondary brake actuating units, increasing the total brake force applied by the energized secondary brake actuating unit and its associated primary brake actuating unit beyond the maximum brake force level attained by energization of that primary brake actuating unit and decreasing the total brake force applied by the primary brake actuating unit associated with the deenergized secondary brake actuating unit below the maximum brake force level attained by energization of that primary brake actuating unit, causing the primary brake actuating unit associated with the energized secondary brake actuating unit has been inserted to follow up the action of the energized secondary brake actuating unit and the primary brake actuating unit associated with the energized secondary brake actuating unit has been inserted until the primary brake actuating unit associated with the deenergized secondary brake actuating unit again attains the maximum brake force level;

(d) and continuing said cyclicly alternate operation and stepped follow-up actions until the demanded total braking force is met.

9. Vehicle wheel brake apparatus comprising an actuator mechanism for generating a desired braking force by moving friction braking means into friction braking contact with a rotatably movable wheel brake member to be braked and for preventing wheel lock caused by excessive applied braking force in relation to road service adhesion of the wheel tire during such braking, said actuator mechanism comprising:

first and second primary actuating units operable in forward movement for moving said friction braking means into friction braking contact with said movable member to be braked and generating a braking force, and operable in backing up movement to decrease and when desired to eliminate the generated braking force, said primary actuating units each one having a non-backdriveable output preventing backing up movement thereof when loaded beyond its braking force output;

first and second secondary actuating units respectively in braking force transmitting series with said first and second primary actuating units for generating braking force which is additional to the braking force output of said first and second primary actuating units and further urging said friction braking means into greater friction braking relation with said movable member to be braked;

a first controller for operating said first and second primary actuating units in accordance with braking force demands and maintaining said first and second primary actuating units at their maximum braking force outputs while the braking force demands exceed their maximum braking force outputs;

a second controller for alternately operating said first and second secondary actuating units to alternately urge said friction braking means into greater friction braking relation with said movable member to be braked and in so doing the operated one of said secondary actuating units acting to reduce the resistance to further actuating movement of said primary actuating unit associated with the other of said secondary actuating units below the maximum braking force output of said last mentioned primary actuating unit so that said last mentioned primary actuating unit, being continually operated to attain its maximum braking force output, follows up the action of the operated one of said secondary actuating units until the maximum braking force output of said last mentioned primary actuating unit is again attained;

said alternate operation and stepped follow-up actions being cyclicly continued under normal service braking operation until the braking force demand is attained;

said actuator mechanism further comprising:

a wheel slip sensor and signal generator for sensing wheel slip relative to the road surface and generating signals bearing a direct relation to the sensed wheel slip;

and additional control means receiving said generated wheel slip signals and, in response to said signals indicating a predetermined wheel slip value denoting incipient wheel lock, setting the maximum braking force of said first and second primary actuating units at the braking force being exerted by said primary actuating units at the time said wheel slip signals indicating the predetermined wheel slip value is received by said additional control means;

said additional control means, in further response to said wheel slip signals indicating said predetermined wheel slip value, deenergizing both of said first and second secondary actuating units and by such deenergization decreasing the total braking force being exerted on said friction braking means by said primary and said secondary actuating units with a resultant decrease in wheel slip, and thereafter controlling said second controller to concurrently operate said secondary actuating units to cyclicly urge said friction braking means into greater and then less friction braking relation with said rotatably movable member while limiting the wheel slip so that it is no greater than said predetermined wheel slip value while braking action is continued.

10. The vehicle brake apparatus of claim 9 further comprising:

means sensing the actual braking force being exerted by said primary and secondary actuating units on said friction braking means and generating signals indicating same to said additional control means.

11. The vehicle brake apparatus of claim 9 further comprising:

said wheel slip sensor and signal generator continuing to sense wheel slip while braking action is continued and said additional control means acting, in response to changes in wheel slip beyond the control of the energization and deenergization of said secondary actuating units, to reset the maximum braking force of said primary actuating units to one of at least greater and lesser braking force values depending upon whether such change in wheel slip is one of at least incipiently an increase beyond said predetermined wheel slip and an incipient decrease below the wheel slip obtained while said secondary actuating units are both deenergized.

12. The vehicle brake apparatus of claim 9 in which said secondary actuating units include piezoelectric crystals, said second controller controls the application of electric voltage to said first and second secondary actuating unit crystals in alternate phase relation during braking action so long as said predetermined wheel slip is not attained, and said additional control means act through said second controller to control the application of electric voltage to said first and second secondary actuating unit crystals in concurrent cyclic energized and deenergized phase relation when said predetermined wheel slip value wheel slip signal is generated and received by said additional control means.

13. The vehicle wheel brake apparatus of claim 9 in which said first and second primary actuating units each include a reversibly actuatable electric motor, and said non-backdriveable output includes a power screw driveline driven by said motor, said power screw driveline having non-backdriveable screw leads.

14. The vehicle wheel brake apparatus of cl aim 9 in which said first and second primary actuating units each include a reversibly actuatable motor, said first and second secondary actuating units include piezoelectric crystals, and said second controller and said additional control means control the application of electric voltage to said crystals at selected rates of change of voltage input to control the amount of expansion and contraction of said crystals during each cycle of energization and deenergization of said crystals either under control of said second controller alone on under control of said additional control means controlling said second controller as aforesaid.

15. The method of actuating a vehicle wheel brake apparatus to a demanded brake force level applied to a wheel to be braked so long as that level of brake actuating force does not cause wheel slip beyond a predetermined maximum which is substantially less than 100% wheel slip but indicates the presence of incipient wheel lock due to braking the wheel, the brake apparatus having first and second primary brake actuating units and first and second secondary brake actuating units, the first and second secondary brake actuating units being respectively in brake force applying series with the first and second primary brake actuating units, said method comprising the steps of:
  (a) energizing the primary brake actuating units and actuating the brake apparatus to a first brake force level braking the wheel by energization of only the primary brake actuating units which first brake force level braking the wheel is less than the demanded brake force level for braking the wheel;
  (b) maintaining the primary brake actuating units so energized to maintain the first brake force level;
  (c) cyclicly alternately and oppositely energizing and deenergizing the first and second secondary brake actuating units, increasing the total brake force applied by the energized secondary brake actuating unit and its associated primary brake actuating unit beyond the first brake force level attained by energization of that primary brake actuating unit, and decreasing the total brake force applied to brake the wheel by the primary brake actuating unit associated with the deenergized secondary brake actuating unit below the first brake force level attained by energization of that primary brake actuating unit, causing the primary brake actuating unit associated with the deenergized secondary brake actuating unit to follow up the action of the energized secondary brake actuating unit and the primary brake actuating unit associated with the energized secondary brake actuating unit has been inserted until the primary brake actuating unit associated with the deenergized secondary brake actuating unit again attains the first brake force level braking the wheel;
  (d) continuing said cyclicly alternate operation and follow-up actions
  (e) until at least one of the demanded total braking force for braking the wheel is met and the predetermined amount of wheel slip of the wheel being braked is attained; and when the predetermined amount of wheel slip is attained, when
  (f) limiting the brake force level exerted by the primary actuating units to a value which is insufficient to cause the predetermined amount of wheel slip to be attained, and concurrently deenergizing and energizing the first and second secondary brake actuating until while continuing to prevent the predetermined amount of wheel slip to be exceeded;
  (g) and continuing iterations of step (f) with changes in the total brake force acting on the wheel being braked at which the predetermined amount of wheel slip is attained while braking action is being demanded.

* * * * *